United States Patent
Seo

(10) Patent No.: US 10,499,372 B2
(45) Date of Patent: Dec. 3, 2019

(54) METHOD FOR DECIDING RESOURCE-SPECIFIC TRANSMISSION MODE IN WIRELESS COMMUNICATION SYSTEM AND APPARATUS FOR SAME

(75) Inventor: Hanbyul Seo, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 67 days.

(21) Appl. No.: 13/984,499

(22) PCT Filed: Mar. 27, 2012

(86) PCT No.: PCT/KR2012/002211
§ 371 (c)(1),
(2), (4) Date: Aug. 8, 2013

(87) PCT Pub. No.: WO2012/134140
PCT Pub. Date: Oct. 4, 2012

(65) Prior Publication Data
US 2013/0315192 A1    Nov. 28, 2013

Related U.S. Application Data

(60) Provisional application No. 61/469,079, filed on Mar. 29, 2011, provisional application No. 61/479,413, filed on Apr. 27, 2011.

(51) Int. Cl.
*H04W 4/00* (2018.01)
*H04W 72/04* (2009.01)
(Continued)

(52) U.S. Cl.
CPC .......... *H04W 72/04* (2013.01); *H04B 7/0632* (2013.01); *H04B 7/0639* (2013.01);
(Continued)

(58) Field of Classification Search
CPC ............. H04L 27/2626; H04L 27/2602; H04L 27/2601; H04L 27/2613; H04L 27/2627;
(Continued)

(56) References Cited

U.S. PATENT DOCUMENTS

2007/0133479 A1    6/2007  Montojo et al.
2009/0262854 A1*  10/2009  Lee, II ................. H04B 7/0417
                                                                     375/267
(Continued)

FOREIGN PATENT DOCUMENTS

CN         101297565 A         10/2008
JP         2009-508372 A       2/2009
(Continued)

OTHER PUBLICATIONS

Alcatel-Lucent, "Signaling of MBSFN Subframe Allocations", 3GPP TSG-RAN WG1 #51 bis, R1-080210, Sevilla, Spain, Jan. 14-18, 2008, 3 pages.
(Continued)

*Primary Examiner* — Atique Ahmed
(74) *Attorney, Agent, or Firm* — Birch, Stewart, Kolasch & Birch, LLP

(57) ABSTRACT

A method for a user equipment transmitting/receiving signals to and from a base station in a wireless communication system is disclosed in the present invention, which is specifically characterized by comprising the following steps: receiving form the base station information related to a plurality of subframe sets; receiving from the base station information related to transmission modes which correspond to each of the plurality of subframe sets; and transmitting/receiving the signals to and from the base station based on the transmission mode that corresponds to a specific subframe set in a subframe that belongs to the specific subframe set from the plurality of subframe sets.

4 Claims, 9 Drawing Sheets

(51) Int. Cl.
    *H04J 11/00*      (2006.01)
    *H04B 7/06*       (2006.01)
    *H04B 7/10*       (2017.01)
    *H04W 72/12*      (2009.01)

(52) U.S. Cl.
    CPC ............ *H04B 7/10* (2013.01); *H04J 11/0053* (2013.01); *H04W 72/1231* (2013.01)

(58) Field of Classification Search
    CPC ........... H04W 72/0413; H04W 72/042; H04W 72/0453; H04W 72/082; H04W 84/12
    USPC .................. 370/329, 312, 345, 336; 375/260
    See application file for complete search history.

(56) References Cited

U.S. PATENT DOCUMENTS

| | | | |
|---|---|---|---|
| 2010/0008282 A1 | 1/2010 | Bhattad et al. | |
| 2010/0177746 A1* | 7/2010 | Gorokhov et al. | 370/336 |
| 2010/0238984 A1 | 9/2010 | Sayana et al. | |
| 2010/0271970 A1* | 10/2010 | Pan | H04L 1/0026 370/252 |
| 2010/0279628 A1* | 11/2010 | Love | H04L 5/003 455/70 |
| 2010/0322227 A1* | 12/2010 | Luo | H04B 7/024 370/345 |
| 2011/0026462 A1 | 2/2011 | Montojo et al. | |
| 2011/0098054 A1* | 4/2011 | Gorokhov | H04B 7/024 455/452.1 |
| 2011/0116437 A1* | 5/2011 | Chen | H04B 7/0689 370/312 |
| 2011/0170496 A1* | 7/2011 | Fong | H04L 5/0053 370/329 |
| 2011/0205951 A1 | 8/2011 | Lee et al. | |
| 2011/0249643 A1* | 10/2011 | Barbieri | H04L 1/0026 370/329 |
| 2011/0274188 A1* | 11/2011 | Sayana | H04B 7/0639 375/260 |
| 2012/0082248 A1* | 4/2012 | Han | H04B 7/0413 375/259 |
| 2012/0093073 A1* | 4/2012 | Lunttila | H04L 1/1607 370/328 |
| 2012/0099536 A1 | 4/2012 | Lee et al. | |
| 2012/0106501 A1 | 5/2012 | Kishiyama et al. | |
| 2012/0201154 A1* | 8/2012 | Chandrasekhar | H04W 24/10 370/252 |

FOREIGN PATENT DOCUMENTS

| | | |
|---|---|---|
| JP | 2010-114893 A | 5/2010 |
| JP | 2010-219817 A | 9/2010 |
| JP | 2012-138753 A | 7/2012 |
| JP | 2012-532495 A | 12/2012 |
| JP | 2013-602867 A | 1/2013 |
| KR | 10-2009-0110772 A | 10/2009 |
| KR | 10-2010-0036212 A | 4/2010 |
| KR | 10-2010-0107278 A | 10/2010 |
| KR | 10-2010-0137357 A | 12/2010 |
| WO | WO 2011/008519 A1 | 1/2011 |
| WO | WO 2011/022733 A2 | 2/2011 |

OTHER PUBLICATIONS

Samsung, "DL transmission mode in MBSFN subframes", 3GPP TSG RAN WG1 #62bis, R1-105386, Xi'an, China, Oct. 11-15, 2010, 3 pages.

ZTE, "CSI-RS scrambling sequence design in LTE-A", 3GPP TSG RAN WG1 Meeting #62bis, Xi'an, China, Oct. 11-15, 2010, R1-105463, 4 pages.

Catt, "Further considerations on scenario 3 and 4", 3GPP TSG RAN WG1 Meeting #64, Taipei, Feb. 21-25, 2011, R1-110720, 4 pages.

ZTE, "Further consideration for CoMP scenarios", 3GPP TSG-RAN WG1 #64, Taipei, Feb. 21-25, 2011, R1-110814, pp. 1-4.

* cited by examiner

FIG. 2
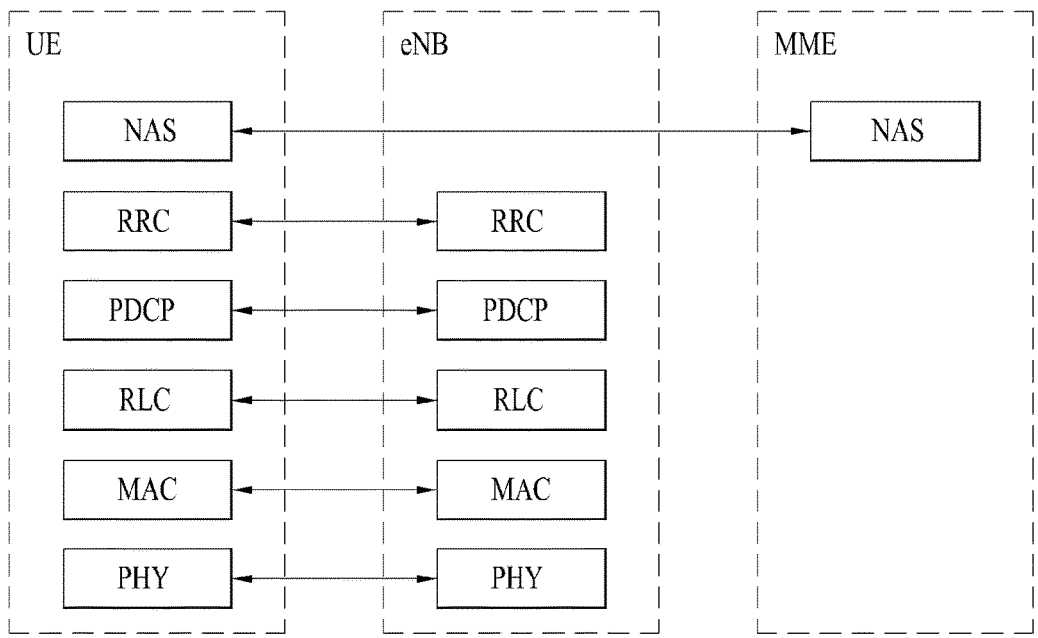
(A) CONTROL-PLANE PROTOCOL STACK
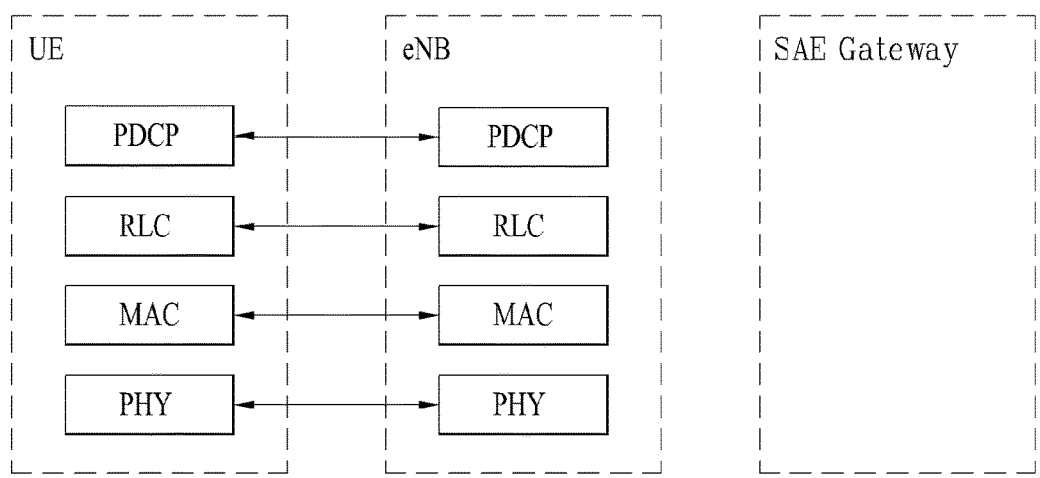
(B) USER-PLANE PROTOCOL STACK

METHOD FOR DECIDING RESOURCE-SPECIFIC TRANSMISSION MODE IN WIRELESS COMMUNICATION SYSTEM AND APPARATUS FOR SAME

CROSS REFERENCE TO RELATED APPLICATIONS

This application is the National Phase of PCT/KR2012/002211 filed on Mar. 27, 2012, which claims priority under 35 U.S.C. 119(e) to U.S. Provisional Application Nos. 61/469,079 filed on Mar. 29, 2011, and 61/479,413 filed on Apr. 27, 2011, all of which are hereby expressly incorporated by reference into the present application.

TECHNICAL FIELD

The present invention relates to a wireless communication system, and more particularly, to a method and apparatus for determining a resource-specific transmission mode in a wireless communication system.

BACKGROUND ART

A brief description will be given of a $3^{rd}$ Generation Partnership Project Long Term Evolution (3GPP LTE) system as an example of a wireless communication system to which the present invention can be applied.

FIG. 1 illustrates a configuration of an Evolved Universal Mobile Telecommunications System (E-UMTS) network as an exemplary wireless communication system. The E-UMTS system is an evolution of the legacy UMTS system and the 3GPP is working on standardization of E-UMTS. E-UMTS is also called an LTE system. For details of the technical specifications of UMTS and E-UMTS, refer to Release 7 and Release 8 of "$3^{rd}$ Generation Partnership Project; Technical Specification Group Radio Access Network", respectively.

Referring to FIG. 1, the E-UMTS system includes a User Equipment (UE), an evolved Node B (eNode B or eNB), and an Access Gateway (AG) which is located at an end of an Evolved UMTS Terrestrial Radio Access Network (E-UTRAN) and connected to an external network. The eNB may transmit multiple data streams simultaneously, for broadcast service, multicast service, and/or unicast service.

A single eNB manages one or more cells. A cell is set to operate in one of the bandwidths of 1.25, 2.5, 5, 10, 15 and 20 Mhz and provides Downlink (DL) or Uplink (UL) transmission service to a plurality of UEs in the bandwidth. Different cells may be configured so as to provide different bandwidths. An eNB controls data transmission and reception to and from a plurality of UEs. Regarding DL data, the eNB notifies a particular UE of a time-frequency area in which the DL data is supposed to be transmitted, a coding scheme, a data size, Hybrid Automatic Repeat reQuest (HARQ) information, etc. by transmitting DL scheduling information to the UE. Regarding UL data, the eNB notifies a particular UE of a time-frequency area in which the UE can transmit data, a coding scheme, a data size, HARQ information, etc. by transmitting UL scheduling information to the UE. An interface for transmitting user traffic or control traffic may be defined between eNBs. A Core Network (CN) may include an AG and a network node for user registration of UEs. The AG manages the mobility of UEs on a Tracking Area (TA) basis. A TA includes a plurality of cells.

While the development stage of wireless communication technology has reached LTE based on Wideband Code Division Multiple Access (WCDMA), the demands and expectation of users and service providers are increasing. Considering that other radio access technologies are under development, new technological evolutions are required to achieve future competitiveness. Specifically, cost reduction per bit, increased service availability, flexible use of frequency bands, a simplified structure, an open interface, appropriate power consumption of UEs, etc. are required.

DISCLOSURE

Technical Problem

An object of the present invention devised to solve the conventional problem is to provide a method and apparatus for determining a resource-specific transmission mode in a wireless communication system.

Advantageous Effects

According to the embodiments of the present invention, a User Equipment (UE) can effectively perform a resource-specific measurement scheme.

It will be appreciated by persons skilled in the art that the effects that can be achieved with the present invention are not limited to what has been particularly described hereinabove and other advantages of the present invention will be more clearly understood from the following detailed description taken in conjunction with the accompanying drawings.

BRIEF DESCRIPTION OF THE DRAWINGS

FIG. 2 illustrates a control-plane protocol stack and a user-plane protocol stack in a radio interface protocol architecture conforming to a $3^{rd}$ Generation Partnership Project (3GPP) radio access network standard between a User Equipment (UE) and an Evolved UMTS Terrestrial Radio Access Network (E-UTRAN);

BEST MODE FOR CARRYING OUT THE INVENTION

Figure 1:
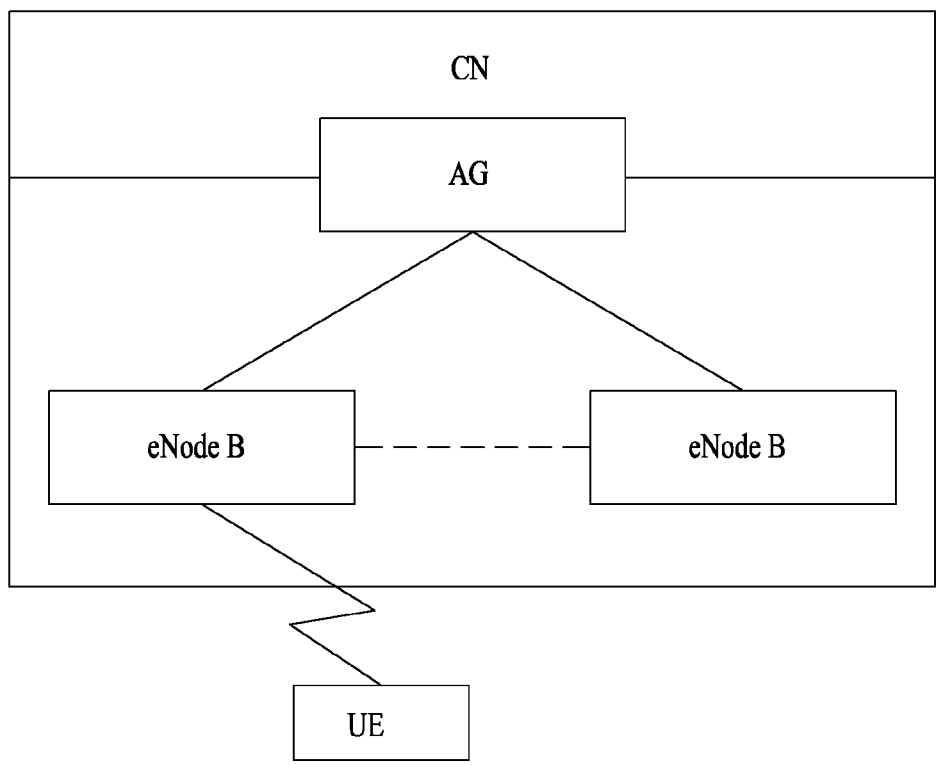
FIG. 1 illustrates a configuration of an Evolved Universal Mobile Telecommunications System (E-UMTS) network as an example of a wireless communication system.

The configuration, operation, and other features of the present invention will readily be understood with embodiments of the present invention described with reference to the attached drawings. Embodiments of the present invention as set forth herein are examples in which the technical features of the present invention are applied to a 3$^{rd}$ Generation Partnership Project (3GPP) system.

While embodiments of the present invention are described in the context of Long Term Evolution (LTE) and LTE-Advanced (LTE-A) systems, they are purely exemplary. Therefore, the embodiments of the present invention are applicable to any other communication system as long as the above definitions are valid for the communication system. In addition, while the embodiments of the present invention are described in the context of Frequency Division Duplexing (FDD), they are also readily applicable to Half-FDD (H-FDD) or Time Division Duplexing (TDD) with some modifications.

FIG. 2 illustrates control-plane and user-plane protocol stacks in a radio interface protocol architecture conforming to a 3GPP wireless access network standard between a User Equipment (UE) and an Evolved UMTS Terrestrial Radio Access Network (E-UTRAN). The control plane is a path in which the UE and the E-UTRAN transmit control messages to manage calls, and the user plane is a path in which data generated from an application layer, for example, voice data or Internet packet data is transmitted.

A PHYsical (PHY) layer at Layer 1 (L1) provides information transfer service to its higher layer, a Medium Access Control (MAC) layer. The PHY layer is connected to the MAC layer via transport channels. The transport channels deliver data between the MAC layer and the PHY layer. Data is transmitted on physical channels between the PHY layers of a transmitter and a receiver. The physical channels use time and frequency as radio resources. Specifically, the physical channels are modulated in Orthogonal Frequency Division Multiple Access (OFDMA) for downlink and in Single Carrier Frequency Division Multiple Access (SC-FDMA) for uplink.

The MAC layer at Layer 2 (L2) provides service to its higher layer, a Radio Link Control (RLC) layer via logical channels. The RLC layer at L2 supports reliable data transmission. RLC functionality may be implemented in a function block of the MAC layer. A Packet Data Convergence Protocol (PDCP) layer at L2 performs header compression to reduce the amount of unnecessary control information and thus efficiently transmit Internet Protocol (IP) packets such as IP version 4 (IPv4) or IP version 6 (IPv6) packets via an air interface having a narrow bandwidth.

A Radio Resource Control (RRC) layer at the lowest part of Layer 3 (or L3) is defined only on the control plane. The RRC layer controls logical channels, transport channels, and physical channels in relation to configuration, reconfiguration, and release of Radio Bearers (RBs). An RB refers to a service provided at L2, for data transmission between the UE and the E-UTRAN. For this purpose, the RRC layers of the UE and the E-UTRAN exchange RRC messages with each other. If an RRC connection is established between the UE and the E-UTRAN, the UE is in RRC Connected mode and otherwise, the UE is in RRC Idle mode. A Non-Access Stratum (NAS) layer above the RRC layer performs functions including session management and mobility management.

A cell covered by an eNB is set to one of the bandwidths of 1.25, 2.5, 5, 10, 15, and 20 MHz and provides downlink or uplink transmission service in the bandwidth to a plurality of UEs. Different cells may be set to provide different bandwidths.

Downlink transport channels used to deliver data from the E-UTRAN to UEs include a Broadcast Channel (BCH) carrying system information, a Paging Channel (PCH) carrying a paging message, and a Shared Channel (SCH) carrying user traffic or a control message. Downlink multicast traffic or control messages or downlink broadcast traffic or control messages may be transmitted on a downlink SCH or a separately defined downlink Multicast Channel (MCH). Uplink transport channels used to deliver data from a UE to the E-UTRAN include a Random Access Channel (RACH) carrying an initial control message and an uplink SCH carrying user traffic or a control message. Logical channels that are defined above transport channels and mapped to the transport channels include a Broadcast Control Channel (BCCH), a Paging Control Channel (PCCH), a Common Control Channel (CCCH), a Multicast Control Channel (MCCH), a Multicast Traffic Channel (MTCH), etc.

Figure 3:
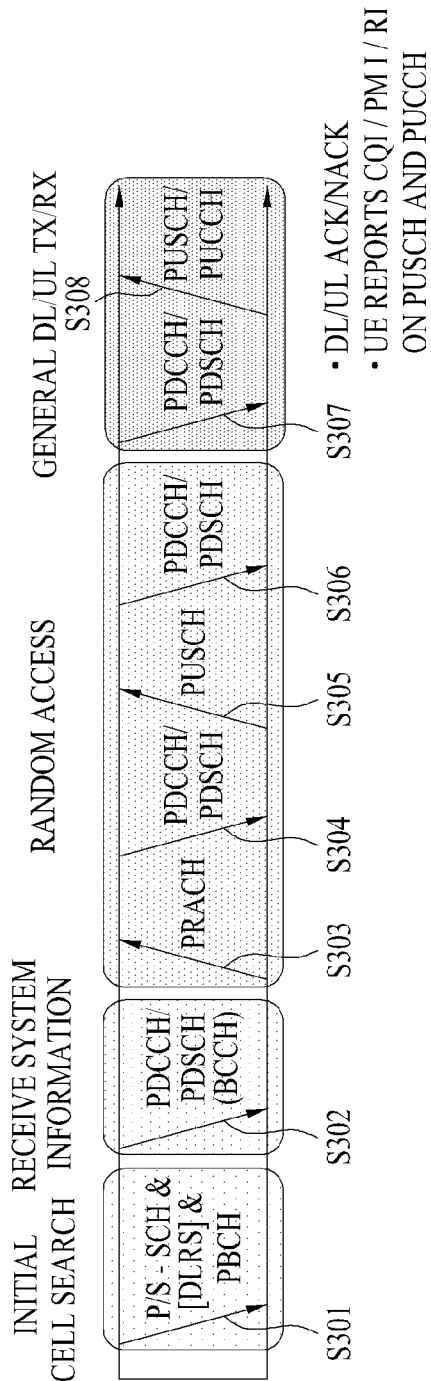
FIG. 3 illustrates physical channels and a general signal transmission method using the physical channels in a 3GPP system.

FIG. 3 illustrates physical channels and a general method for transmitting signals on the physical channels in the 3GPP system.

Referring to FIG. 3, when a UE is powered on or enters a new cell, the UE performs initial cell search (S301). The initial cell search involves acquisition of synchronization to an eNB. Specifically, the UE synchronizes its timing to the eNB and acquires a cell Identifier (ID) and other information by receiving a Primary Synchronization Channel (P-SCH) and a Secondary Synchronization Channel (S-SCH) from the eNB. Then the UE may acquire information broadcast in the cell by receiving a Physical Broadcast Channel (PBCH) from the eNB. During the initial cell search, the UE may monitor a downlink channel state by receiving a DownLink Reference Signal (DL RS).

After the initial cell search, the UE may acquire detailed system information by receiving a Physical Downlink Control Channel (PDCCH) and receiving a Physical Downlink Shared Channel (PDSCH) based on information included in the PDCCH (S302).

If the UE initially accesses the eNB or has no radio resources for signal transmission to the eNB, the UE may perform a random access procedure with the eNB (S303 to S306). In the random access procedure, the UE may transmit a predetermined sequence as a preamble on a Physical Random Access Channel (PRACH) (S303 and S305) and may receive a response message to the preamble on a PDCCH and a PDSCH associated with the PDCCH (S304 and S306). In case of a contention-based RACH, the UE may additionally perform a contention resolution procedure.

After the above procedure, the UE may receive a PDCCH and/or a PDSCH from the eNB (S307) and transmit a Physical Uplink Shared Channel (PUSCH) and/or a Physical Uplink Control Channel (PUCCH) to the eNB (S308), which is a general downlink and uplink signal transmission procedure. Particularly, the UE receives Downlink Control Information (DCI) on a PDCCH. Herein, the DCI includes control information such as resource allocation information for the UE. Different DCI formats are defined according to different usages of DCI.

Control information that the UE transmits to the eNB on the uplink or receives from the eNB on the downlink includes a downlink/uplink ACKnowledgment/Negative ACKnowledgment (ACK/NACK) signal, a Channel Quality Indicator (CQI), a Precoding Matrix Index (PMI), a Rank Indicator (RI), etc. In the 3GPP LTE system, the UE may transmit control information such as a CQI, a PMI, an RI, etc. on a PUSCH and/or a PUCCH.

Figure 4:
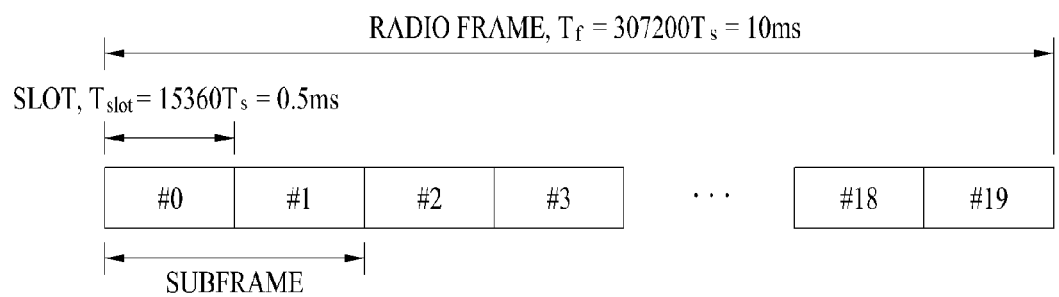
FIG. 4 illustrates a structure of a radio frame in a Long Term Evolution (LTE) system.

FIG. 4 illustrates a structure of a radio frame used in the LTE system.

Referring to FIG. 4, a radio frame is 10 ms (327200×$T_s$) long and divided into 10 equal-sized subframes. Each subframe is 1 ms long and further divided into two slots. Each time slot is 0.5 ms (15360×$T_s$) long. Herein, $T_s$ represents a sampling time and $T_s=1/(15\ \text{kHz}\times2048)=3.2552\times10^{-8}$ (about 33 ns). A slot includes a plurality of OFDM symbols or SC-FDMA symbols in the time domain by a plurality of Resource Blocks (RBs) in the frequency domain. In the LTE system, one RB includes 12 subcarriers by 7 (or 6) OFDM symbols. A unit time in which data is transmitted is defined as Transmission Time Interval (TTI). The TTI may be defined as one or more subframes. The above-described radio frame structure is purely exemplary and thus the number of subframes in a radio frame, the number of slots in a subframe, or the number of OFDM symbols in a slot may vary.

Figure 5:
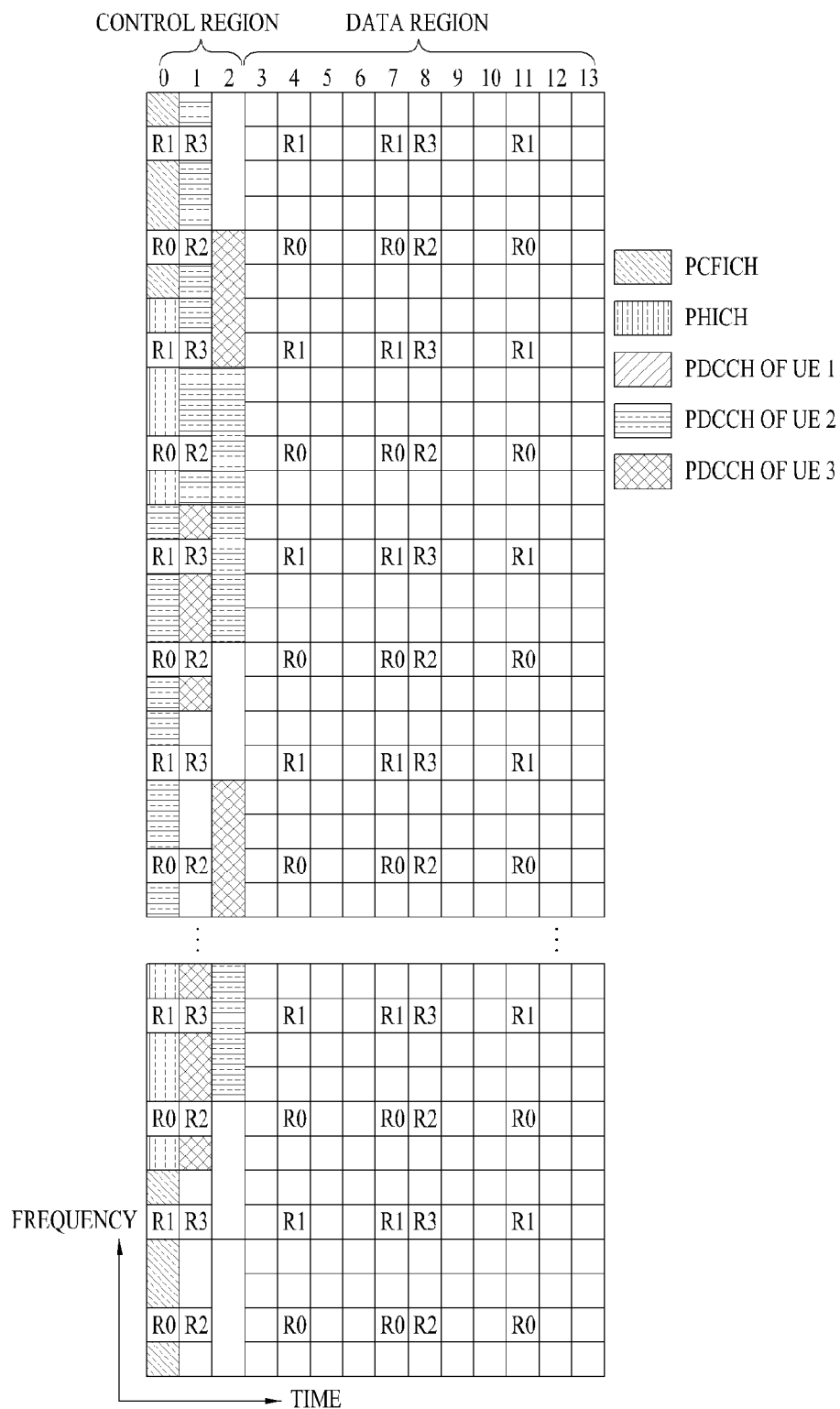
FIG. 5 illustrates a structure of a downlink radio frame in the LTE system.

FIG. 5 illustrates an exemplary control channel included in the control region of a subframe in a downlink radio frame.

Referring to FIG. 5, a subframe includes 14 OFDM symbols. The first one to three OFDM symbols of a subframe are used for a control region and the other 13 to 11 OFDM symbols are used for a data region according to a subframe configuration. In FIG. 5, reference characters R1 to R4 denote RSs or pilot signals for antenna 0 to antenna 3. RSs are allocated in a predetermined pattern in a subframe irrespective of the control region and the data region. A control channel is allocated to non-RS resources in the control region and a traffic channel is also allocated to non-RS resources in the data region. Control channels allocated to the control region include a Physical Control Format Indicator Channel (PCFICH), a Physical Hybrid-ARQ Indicator Channel (PHICH), a Physical Downlink Control Channel (PDCCH), etc.

The PCFICH is a physical control format indicator channel carrying information about the number of OFDM symbols used for PDCCHs in each subframe. The PCFICH is located in the first OFDM symbol of a subframe and configured with priority over the PHICH and the PDCCH. The PCFICH is composed of 4 Resource Element Groups (REGs), each REG being distributed to the control region based on a cell Identity (ID). One REG includes 4 Resource Elements (REs). An RE is a minimum physical resource defined by one subcarrier by one OFDM symbol. The PCFICH indicates 1 to 3 or 2 to 4 according to a bandwidth. The PCFICH is modulated in Quadrature Phase Shift Keying (QPSK).

The PHICH is a physical Hybrid-Automatic Repeat and request (HARQ) indicator channel carrying an HARQ ACK/NACK for an uplink transmission. That is, the PHICH is a channel that delivers DL ACK/NACK information for UL HARQ. The PHICH includes one REG and is scrambled cell-specifically. An ACK/NACK is indicated in one bit and modulated in Binary Phase Shift Keying (BPSK). The modulated ACK/NACK is spread with a Spreading Factor (SF) of 2 or 4. A plurality of PHICHs mapped to the same resources form a PHICH group. The number of PHICHs multiplexed into a PHICH group is determined according to the number of spreading codes. A PHICH (group) is repeated three times to obtain a diversity gain in the frequency domain and/or the time domain.

The PDCCH is a physical downlink control channel allocated to the first n OFDM symbols of a subframe. Herein, n is 1 or a larger integer indicated by the PCFICH. The PDCCH is composed of one or more CCEs. The PDCCH carries resource allocation information about transport channels, PCH and DL-SCH, an uplink scheduling grant, and HARQ information to each UE or UE group. The PCH and the DL-SCH are transmitted on a PDSCH. Therefore, an eNB and a UE transmit and receive data usually on the PDSCH, except for specific control information or specific service data.

Information indicating one or more UEs to receive PDSCH data and information indicating how the UEs are supposed to receive and decode the PDSCH data are delivered on a PDCCH. For example, on the assumption that the Cyclic Redundancy Check (CRC) of a specific PDCCH is masked by Radio Network Temporary Identity (RNTI) "A" and information about data transmitted in radio resources (e.g. at a frequency position) "B" based on transport format information (e.g. a transport block size, a modulation scheme, coding information, etc.) "C" is transmitted in a specific subframe, a UE within a cell monitors, that is, blind-decodes a PDCCH using its RNTI information in a search space. If one or more UEs have RNTI "A", these UEs receive the PDCCH and receive a PDSCH indicated by "B" and "C" based on information of the received PDCCH.

Figure 6:
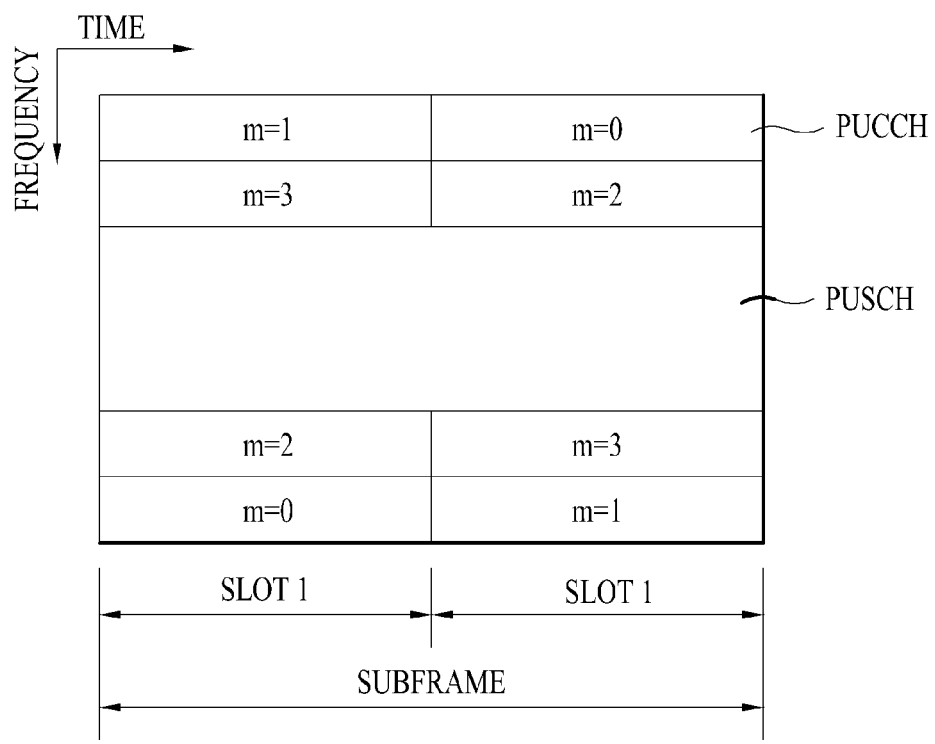
FIG. 6 illustrates a structure of an uplink subframe in the LTE system.

FIG. 6 illustrates a structure of an uplink subframe in the LTE system.

Referring to FIG. 6, an uplink subframe may be divided into a control region and a data region. A Physical Uplink Control Channel (PUCCH) including uplink control information is allocated to the control region and a Physical uplink Shared Channel (PUSCH) including user data is allocated to the data region. The middle of the subframe is allocated to the PUSCH, while both sides of the data region in the frequency domain are allocated to the PUCCH. Control information transmitted on the PUCCH may include a Hybrid Automatic Repeat reQuest ACKnowledgement/Negative ACKnowledgement (HARQ ARCK/NACK), a Channel Quality Indicator (CQI) representing a downlink channel state, a Rank Indicator (RI) for Multiple Input Multiple Output (MIMO), a Scheduling Request (SR) requesting uplink resource allocation. A PUCCH for one UE occupies one Resource Block (RB) in each slot of a subframe. That is, the two RBs allocated to the PUCCH frequency-hop over the slot boundary of the subframe. Particularly, PUCCHs with m=0, m=1, and m=2 are allocated to a subframe in FIG. 6.

Now a description will be given of a Multiple Input Multiple Output (MIMO) system. MIMO can increase the transmission and reception efficiency of data by using a plurality of Transmission (Tx) antennas and a plurality of Reception (Rx) antennas. That is, with the use of multiple antennas at a transmitter or a receiver, MIMO can increase capacity and improve performance in a wireless communication system. The term "MIMO" is interchangeable with "multi-antenna".

The MIMO technology does not depend on a single antenna path to receive a whole message. Rather, it completes the message by combining data fragments received through a plurality of antennas. MIMO can increase data rate within a cell area of a predetermined size or extend system coverage at a given data rate. In addition, MIMO can find its use in a wide range including mobile terminals, relays, etc. MIMO can overcome a limited transmission capacity encountered with the conventional single-antenna technology in mobile communication.

Figure 7:
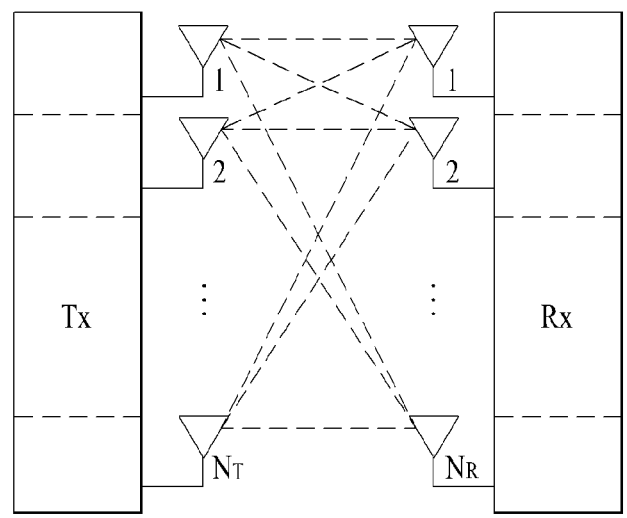
FIG. 7 illustrates a configuration of a general Multiple Input Multiple Output (MIMO) communication system.

FIG. 7 illustrates the configuration of a typical MIMO communication system. Referring to FIG. 7, a transmitter has $N_T$ Tx antennas and a receiver has $N_R$ Rx antennas. The simultaneous use of a plurality of antennas at both the transmitter and the receiver increases a theoretical channel transmission capacity, compared to use of a plurality of antennas at only one of the transmitter and the receiver. The channel transmission capacity increases in proportion to the number of antennas. Therefore, transmission rate and frequency efficiency are increased. Given a maximum transmission rate $R_o$ that may be achieved with a single antenna, the transmission rate may be increased, in theory, to the product of $R_o$ and a transmission rate increase rate $R_i$ in the case of multiple antennas. $R_i$ is the smaller value between $N_T$ and $N_R$.

$$R_i = \min(N_T, N_R) \quad \text{[Equation 1]}$$

For instance, a MIMO communication system with four Tx antennas and four Rx antennas may achieve a four-fold increase in transmission rate theoretically, relative to a single-antenna system. Since the theoretical capacity increase of the MIMO system was verified in the middle 1990s, many techniques have been actively proposed to increase data rate in real implementation. Some of the techniques have already been reflected in various wireless communication standards for 3G mobile communications, future-generation Wireless Local Area Network (WLAN), etc.

Concerning the research trend of MIMO up to now, active studies are underway in many respects of MIMO, inclusive of studies of information theory related to calculation of multi-antenna communication capacity in diverse channel environments and multiple access environments, studies of measuring MIMO radio channels and MIMO modeling, studies of time-space signal processing techniques to increase transmission reliability and transmission rate, etc.

Communication in a MIMO system with $N_T$ Tx antennas and $N_R$ Rx antennas as illustrated in FIG. 7 will be described in detail through mathematical modeling. Regarding a transmission signal, up to $N_T$ pieces of information can be transmitted through the $N_T$ Tx antennas, as expressed as the following vector.

$$s = [s_1, s_2, \ldots, s_{N_T}]^T \quad \text{[Equation 2]}$$

A different transmission power may be applied to each piece of transmission information, $s_1, s_2, \ldots, s_{N_T}$. Let the transmission power levels of the transmission information be denoted by $P_1, P_2, \ldots, P_{N_T}$, respectively. Then the transmission power-controlled transmission information vector is given as $$\hat{s} = [\hat{s}_1, \hat{s}_2, \ldots, \hat{s}_{N_T}]= [P_1 s_1, P_2 s_2, \ldots, P_{N_T} s_{N_T}]^T \quad \text{[Equation 3]}$$

The transmission power-controlled transmission information vector $\hat{s}$ may be expressed as follows, using a diagonal matrix P of transmission power.

$$\hat{s} = \begin{bmatrix} P_1 & & & 0 \\ & P_2 & & \\ & & \ddots & \\ 0 & & & P_{N_T} \end{bmatrix} \begin{bmatrix} s_1 \\ s_2 \\ \vdots \\ s_{N_T} \end{bmatrix} = Ps \quad \text{[Equation 4]}$$

$N_T$ transmission signals $x_1, x_2, \ldots, x_{N_T}$ may be generated by multiplying the transmission power-controlled information vector $\hat{s}$ by a weight matrix W. The weight matrix W functions to appropriately distribute the transmission information to the Tx antennas according to transmission channel states, etc. These $N_T$ transmission signals $x_1, x_2, \ldots, x_{N_T}$ are represented as a vector x, which may be determined by [Equation 5]. Herein, $w_{ij}$ denotes a weight between a $j^{th}$ piece of information and an $i^{th}$ Tx antenna and W is referred to as a weight matrix or a precoding matrix.

$$x = \begin{bmatrix} x_1 \\ x_2 \\ \vdots \\ x_i \\ \vdots \\ x_{N_T} \end{bmatrix} \quad \text{[Equation 5]}$$

$$= \begin{bmatrix} w_{11} & w_{12} & \cdots & w_{1N_T} \\ w_{21} & w_{22} & \cdots & w_{w 2N_T} \\ \vdots & & \ddots & \vdots \\ w_{i1} & w_{i2} & \cdots & w_{iN_T} \\ \vdots & & \ddots & \vdots \\ w_{N_T 1} & w_{N_T 2} & \cdots & w_{N_T N_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix}$$

$$= W\hat{s} = WPs$$

In general, the rank of a channel matrix is the maximum number of different pieces of information that can be transmitted on a given channel, in its physical meaning. Therefore, the rank of a channel matrix is defined as the smaller between the number of independent rows and the number of independent columns in the channel matrix. The rank of the channel matrix is not larger than the number of rows or columns of the channel matrix. The rank of a channel matrix H, rank(H) satisfies the following constraint.

$$\text{rank}(H) \leq \min(N_T, N_R) \quad \text{[Equation 6]}$$

A different piece of information transmitted in MIMO is referred to as 'transmission stream' or shortly 'stream'. The 'stream' may also be called 'layer'. It is thus concluded that the number of transmission streams is not larger than the rank of channels, i.e. the maximum number of different pieces of transmittable information. Thus, the channel matrix H is determined by $$\text{\# of streams} \leq \text{rank}(H) \leq \min(N_T, N_R) \quad \text{[Equation 7]}$$

"# of streams" denotes the number of streams. One thing to be noted herein is that one stream may be transmitted through one or more antennas.

One or more streams may be mapped to a plurality of antennas in many ways. The stream-to-antenna mapping may be described as follows depending on MIMO schemes. If one stream is transmitted through a plurality of antennas, this may be regarded as spatial diversity. When a plurality of streams are transmitted through a plurality of antennas, this may be spatial multiplexing. Needless to say, a hybrid scheme of spatial diversity and spatial multiplexing in combination may be contemplated.

It is expected that the future-generation mobile communication standard, LTE-A will support Coordinated Multi-Point (CoMP) transmission in order to increase data rate, compared to the legacy standard. CoMP refers to transmission of data to a UE through cooperation from two or more eNBs or cells in order to increase communication performance between a UE located in a shadowing area and an eNB (a cell or sector).

CoMP transmission schemes may be classified into CoMP-Joint Processing (CoMP-JP) called cooperative MIMO characterized by data sharing, and CoMP-Coordinated Scheduling/Beamforming (CoMP-CS/CB).

In downlink CoMP-JP, a UE may instantaneously receive data simultaneously from eNBs that perform CoMP transmission and may combine the received signals, thereby increasing reception performance (Joint Transmission (JT)).

In addition, one of the eNBs participating in the CoMP transmission may transmit data to the UE at a specific time point (Dynamic Point Selection (DPS)). In contrast, in downlink CoMP-CS/CB, a UE may receive data instantaneously from one eNB, that is, a serving eNB by beamforming.

In uplink CoMP-JP, eNBs may receive a PUSCH signal from a UE at the same time (Joint Reception (JR)). In contrast, in uplink CoMP-CS/CB, only one eNB receives a PUSCH from a UE. Herein, cooperative cells (or eNBs) may make a decision as to whether to use CoMP-CS/CB.

Channel State Information (CSI) reporting will be described below. In the current LTE standard, there are two MIMO transmission schemes, open-loop MIMO operating without channel information and closed-loop MIMO operating with channel information. Particularly in the closed-loop MIMO, each of an eNB and a UE may perform beamforming based on CSI to obtain the multiplexing gain of MIMO Tx antennas. To acquire CSI from the UE, the eNB may transmit a Reference Signal (RS) to the UE and may command the UE to feed back measured CSI on a PUCCH or PUSCH.

CSI is classified largely into three information types, RI, PMI, and CQI. An RI is information about a channel rank, as described before. The channel rank is the number of streams that a UE can receive in the same time-frequency resources. Because the RI is determined mainly according to the long-term fading of a channel, the RI may be fed back to an eNB in a longer period than a PMI and a CQI.

A PMI is the index of a UE-preferred eNB precoding matrix determined based on a metric such as Signal to Interference and Noise Ratio (SINR), reflecting the spatial characteristics of channels. A CQI represents a channel strength. In general, the CQI reflects a reception SINR that the eNB can achieve with a PMI.

An advanced system such as an LTE-A system considers achievement of an additional multi-user diversity by the use of Multi-User MIMO (MU-MIMO). Due to the existence of interference channels between UEs multiplexed in an antenna domain in MU-MIMO, the accuracy of CSI may significantly affect interference with other multiplexed UEs as well as a UE that reports the CSI. Accordingly, more accurate CSI than in Single User MIMO (SU-MIMO) should be reported in MU-MIMO.

In this context, the LTE-A standard designs a final PMI separately as a long-term and/or wideband PMI, W1 and a short-term and/or subband PMI, W2.

For example, the long-term covariance matrix of channels expressed as [Equation 8] may be used for hierarchical codebook transformation that configures one final PMI with W1 and W2.

$$W = \text{norm}(W1W2) \quad \text{[Equation 8]}$$

In [Equation 1], W2 is a short-term PMI, which is a codeword of a codebook reflecting short-term channel information, W is a codeword of a final codebook, and norm(A) is a matrix obtained by normalizing the norm of each column of matrix A to 1.

Conventionally, the codewords W1 and W2 are given as [Equation 9].

$$W1(i) = \begin{bmatrix} X_i & 0 \\ 0 & X_i \end{bmatrix}, \quad \text{[Equation 9]}$$

where $X_i$ is Nt/2 by M matrix.

$$W2(j) = \overbrace{\begin{bmatrix} e_M^k & e_M^l & \cdots & e_M^m \\ \alpha_j e_M^k & \beta_j e_M^l & \cdots & \gamma_j e_M^m \end{bmatrix}}^{r \text{ columns}} (\text{if rank} = r),$$

where $1 \leq k, l, m \leq M$ and k, l, m are integer.

In [Equation 9], the codewords are designed so as to reflect correlation characteristics between established channels, if cross polarized antennas are arranged densely, for example, the distance between adjacent antennas is equal to or less than a half of a signal wavelength. The cross polarized antennas may be divided into a horizontal antenna group and a vertical antenna group and the two antenna groups are co-located, each having the property of a Uniform Linear Array (ULA) antenna.

Therefore, the correlations between antennas in each group have the same linear phase increment property and the correlation between the antenna groups is characterized by phase rotation. Since a codebook is eventually quantized values of channels, it is necessary to design a codebook, reflecting channel characteristics. For the convenience of description, a rank-1 codeword designed in the above manner may be given as [Equation 10].

$$W1(i) * W2(j) = \begin{bmatrix} X_i(k) \\ \alpha_j X_i(k) \end{bmatrix} \quad \text{[Equation 10]}$$

In [Equation 10], a codeword is expressed as an $N_T \times 1$ vector where $N_T$ is the number of Tx antennas and the codeword is composed of an upper vector $X_i(k)$ and a lower vector $\alpha_j X_i(k)$, representing the correlation characteristics of the horizontal and vertical antenna groups, respectively. Preferably, $X_i(k)$ is expressed as a vector having the linear phase increment property, reflecting the correlation characteristics between antennas in each antenna group. For example, a Discrete Fourier Transform (DFT) matrix may be used for $X_i(k)$.

An advanced system such as an LTE-A system considers achievement of an additional multi-user diversity by the use of MU-MIMO. Due to the existence of interference channels between UEs multiplexed in an antenna domain in MU-MIMO, the accuracy of CSI may significantly affect interference with other multiplexed UEs as well as a UE that reports the CSI. Accordingly, more accurate CSI than in SU-MIMO should be reported in MU-MIMO.

In CoMP JT, because a plurality of eNBs transmit the same data to a specific UE through cooperation, they may be theoretically regarded as forming a MIMO system with antennas distributed geographically. That is, even when MU-MIMO is implemented in JT, highly accurate CSI is required to avoid interference between CoMP-scheduled UEs as in a single cell MU-MIMO operation. The same thing applies to CoMP CB. That is, to avoid interference with a serving cell caused by a neighbor cell, accurate CSI is needed.

A resource-specific measurement scheme will be described below.

To reduce inter-cell interference, a time-domain inter-cell interference coordination scheme has been proposed, in which an aggressor cell uses a silent subframe (referred to as an Almost Blank Subframe (ABS)) to reduce the transmission power of a physical channel or transmit no channel and a victim cell schedules a UE in consideration of the ABS use of the aggressor cell. Typically, only a CRS is transmitted in a subframe configured as an ABS.

On the part of a UE in the victim cell, an interference level changes significantly in each subframe. To more accurately perform a Radio Link Monitoring (RLM) operation or a Radio Resource Management (RRM) including Reference Signal Received Power/Reference Signal Received Quality (RSRP/RSRQ) measurement, or measure CSI, the RLM/RRM operation should be restricted to a set of subframes having uniform interference characteristics. Therefore, the current 3GPP LTE standard defines two CSI subframe sets for resource-specific measurement.

Exemplary transmission modes will be given below.

The current 3GPP LTE standard document, specifically, 3GPP TS 36.213 defines downlink transmission modes listed in [Table 1] and [Table 2]. The transmission modes are indicated to UEs by higher-layer signaling, that is, RRC signaling.

TABLE 1

| Transmission mode | DCI format | Search Space | Transmission scheme of PDSCH corresponding to PDCCH |
|---|---|---|---|
| Mode 1 | DCI format 1A | Common and UE specific by C-RNTI | Single-antenna port, port 0 |
|  | DCI format 1 | UE specific by C-RNTI | Single-antenna port, port 0 |
| Mode 2 | DCI format 1A | Common and UE specific by C-RNTI | Transmit diversity |
|  | DCI format 1 | UE specific by C-RNTI | Transmit diversity |
| Mode 3 | DCI format 1A | Common and UE specific by C-RNTI | Transmit diversity |
|  | DCI format 2A | UE specific by C-RNTI | Large delay CDD or Transmit diversity |
| Mode 4 | DCI format 1A | Common and UE specific by C-RNTI | Transmit diversity |
|  | DCI format 2 | UE specific by C-RNTI | Closed-loop spatial or Transmit diversity |
| Mode 5 | DCI format 1A | Common and UE specific by C-RNTI | Transmit diversity |
|  | DCI format 1D | UE specific by C-RNTI | Multi-user MIMO |
| Mode 6 | DCI format 1A | Common and UE specific by C-RNTI | Transmit diversity |
|  | DCI format 1B | UE specific by C-RNTI | Closed-loop spatial multiplexing using a single transmission layer |
| Mode 7 | DCI format 1A | Common and UE specific by C-RNTI | If the number of PBCH antenna ports is one, Single-antenna port, port 0 is used, otherwise Transmit diversity |
|  | DCI format 1 | UE specific by C-RNTI | Single-antenna port, port 5 |
| Mode 8 | DCI format 1A | Common and UE specific by C-RNTI | If the number of PBCH antenna ports is one, Single-antenna port, port 0 is used, otherwise Transmit diversity |
|  | DCI format 2B | UE specific by C-RNTI | Dual layer transmission, port 7 and 8 or single-antenna port, port 7 or 8 |
| Mode 9 | DCI format 1A | Common and UE specific by C-RNTI | Non-MBSFN subframe: If the number of PBCH antenna ports is one, Single-antenna port, port 0 is used, otherwise Transmit diversity Signaled HBSFN subframe with unicast allocation: Single-antenna port, port 7 |
|  | DCI format 2C | UE specific by C-RNTI | Up to 8 layer transmission, ports 7-14 |

TABLE 2

| Transmission mode | DCI format | Search Space | Transmission scheme of PDSCH corresponding to PDCCH |
|---|---|---|---|
| Mode 1 | DCI format 1A | Common and UE specific by C-RNTI | Single-antenna port, port 0 |
|  | DCI format 1 | UE specific by C-RNTI | Single-antenna port, port 0 |
| Mode 2 | DCI format 1A | Common and UE specific by C-RNTI | Transmit diversity |
|  | DCI format 1 | UE specific by C-RNTI | Transmit diversity |
| Mode 3 | DCI format 1A | Common and UE specific by C-RNTI | Transmit diversity |
|  | DCI format 2A | UE specific by C-RNTI | Transmit diversity |
| Mode 4 | DCI format 1A | Common and UE specific by C-RNTI | Transmit diversity |
|  | DCI format 2 | UE specific by C-RNTI | Transmit diversity |
| Mode 5 | DCI format 1A | Common and UE specific by C-RNTI | Transmit diversity |
| Mode 6 | DCI format 1A | Common and UE specific by C-RNTI | Transmit diversity |
| Mode 7 | DCI format 1A | Common and UE specific by C-RNTI | Single-antenna port, port 5 |
|  | DCI format 1 | UE specific by C-RNTI | Single-antenna port, port 5 |

TABLE 2-continued

| Transmission mode | DCI format | Search Space | Transmission scheme of PDSCH corresponding to PDCCH |
|---|---|---|---|
| Mode 8 | DCI format 1A | Common and UE specific by C-RNTI | Single-antenna port, port 7 |
|  | DCI format 2B | UE specific by C-RNTI | Single-antenna port, port 7 or 8 |
| Mode 9 | DCI format 1A | Common and UE specific by C-RNTI | Single-antenna port, port 7 |
|  | DCI format 2C | UE specific by C-RNTI | Single-antenna port, port 7 or 8 |

The current 3GPP LTE standard defines DCI formats according to the types of RNTIs by which a PDCCH is masked. Particularly, for C-RNTI and SPS C-RNTI, transmission modes and their associated DCI formats, that is, transmission mode-based DCI formats are defined. DCI format 1A is also defined, which can be applied irrespective of transmission modes. [Table 1] illustrates DCI formats for C-RNTI as an RNTI type by which a PDCCH is masked and [Table 2] illustrates DCI formats for SPS C-RNTI as an RNTI type by which a PDCCH is masked.

For example, if a UE detects DCI format 1B as a result of blind decoding of a PDCCH masked by a C-RNTI in a UE-specific search space according to [Table 1], the UE decodes a PDSCH, considering that the PDSCH has been transmitted in a single layer by closed-loop spatial multiplexing.

To report a CQI to an eNB, the UE generates a CQI by measuring a channel, on the assumption that the eNB transmits an RS in a transmission mode as illustrated in [Table 3]. That is, [Table 3] below lists PDSCH transmission modes of an eNB, which a UE assumes for CQI measurement.

TABLE 3

| Transmission mode | Transmission scheme of PDSCH |
|---|---|
| 1 | Single-antenna port, port 0 |
| 2 | Transmit diversity |
| 3 | Transmit diversity if the associated rank indicator is 1, otherwise large delay CDD |
| 4 | Closed-loop spatial multiplexing |
| 5 | Multi-user MIMO |
| 6 | Closed-loop spatial multiplexing with a single transmission layer |
| 7 | If the number of PBCH antenna ports is one, Single-antenna port, port 0: otherwise Transmit diversity |
| 8 | If the UE is configured without PMI/RI reporting: if the number of PBCH antenna ports is one, single-antenna port, port 0; otherwise transmit diversity<br>If the UE is configured with PMI/RI reporting: closed-loop spatial multiplexing |
| 9 | If the UE is configured without PMI/RI reporting: if the number of PBCH antenna ports is one, single-antenna port, port 0; otherwise transmit diversity<br>Closed-loop spatial multiplexing with up to 8 layer transmission, ports 7-14 |

For example, transmission mode 7 is referred to as a beamforming transmission mode, supporting a single data stream, that is, rank-1 transmission in [Table 3]. If a plurality of PBCH antenna ports are used, the UE measures a CQI, considering that the eNB has transmitted a PDSCH in a transmit diversity mode. The CQI is fed back in the form of an index as illustrated in [Table 4] to the eNB. Each CQI index represents a transport format such as a modulation scheme and a coding rate for the feedback CQI. Thus the eNB determines a transport format based on the received CQI index and transmits a downlink signal to the UE in the transport format.

TABLE 4

| CQI index | modulation | code rate × 1024 | efficiency |
|---|---|---|---|
| 0 |  | out of range |  |
| 1 | QPSK | 78 | 0.1523 |
| 2 | QPSK | 120 | 0.2344 |
| 3 | QPSK | 193 | 0.3770 |
| 4 | QPSK | 308 | 0.6016 |
| 5 | QPSK | 449 | 0.8770 |
| 6 | QPSK | 602 | 1.1758 |
| 7 | 16QAM | 378 | 1.4766 |
| 8 | 16QAM | 490 | 1.9141 |
| 9 | 16QAM | 616 | 2.4063 |
| 10 | 64QAM | 466 | 2.7305 |
| 11 | 64QAM | 567 | 3.3223 |
| 12 | 64QAM | 666 | 3.9023 |
| 13 | 64QAM | 772 | 4.5234 |
| 14 | 64QAM | 873 | 5.1152 |
| 15 | 64QAM | 948 | 5.5547 |

According to the present invention, uplink resources (e.g. uplink subframes) or downlink resources (e.g. downlink subframes) are partitioned into two or more sets and an eNB configures a transmission mode for each set, for downlink data reception or uplink data transmission, so that different transmission modes apply to different subframe sets.

Specifically, the eNB may divide uplink or downlink resources into a plurality of sets for a UE, in advance by higher-layer signaling such as RRC signaling. For example, the eNB may divide total downlink subframes into subframe set 1 and subframe set 2 and may command a UE to feed back CSI about each subframe set. One of reasons for partitioning resources in this manner is that a UE experiences different levels of inter-cell interference in different resource sets. That is, if a neighbor aggressor cell configures a specific subframe set as ABSs, a UE of a victim cell may have a different channel quality depending on whether the aggressor cell transmits an ABS or not. Accordingly, to measure accurate CSI for each subframe, a specific measurement scheme suitable for a subframe set, that is, a subframe set-specific measurement scheme should be applied. In other words, measurement should be performed on the assumption that different levels of interference occur in different subframe sets.

In this context, the present invention proposes that a different uplink or downlink transmission mode is set for each resource set, that is, each subframe set. The resource set-specific transmission mode configuration offers the following advantages.

Because a UE experiences a different level of interference in each resource set, an optimum transmission mode may be configured adaptively according to the interference level of each resource set. For example, the UE may measure and feed back CSI more stably in a subframe set that a neighbor cell configures as ABSs and thus that interferes less. Accordingly, a mode supporting a high transmission rank, such as transmission mode 9 may be appropriate. Referring to [Table 1], it is noted that transmission mode 9 may support up to 8-layer transmission through antenna port 7 to antenna port 14 (antenna port 7 to antenna port 14 refer to antenna ports of UE-specific RSs, i.e. DM-RSs).

On the other hand, interference may fluctuate too much to be predicted according to a precoding scheme adopted in a neighbor cell, in a subframe set that the neighbor cell does not configure as ABSs and thus that interferes with the UE greatly. In this situation, a transmission mode that allows robust packet transmission, for example, transmit diversity of transmission mode 2 may be appropriate. It is noted from [Table 1] that transmission mode 2 supports transmit diversity.

The transmission modes will be described below in greater detail.

Figure 8:
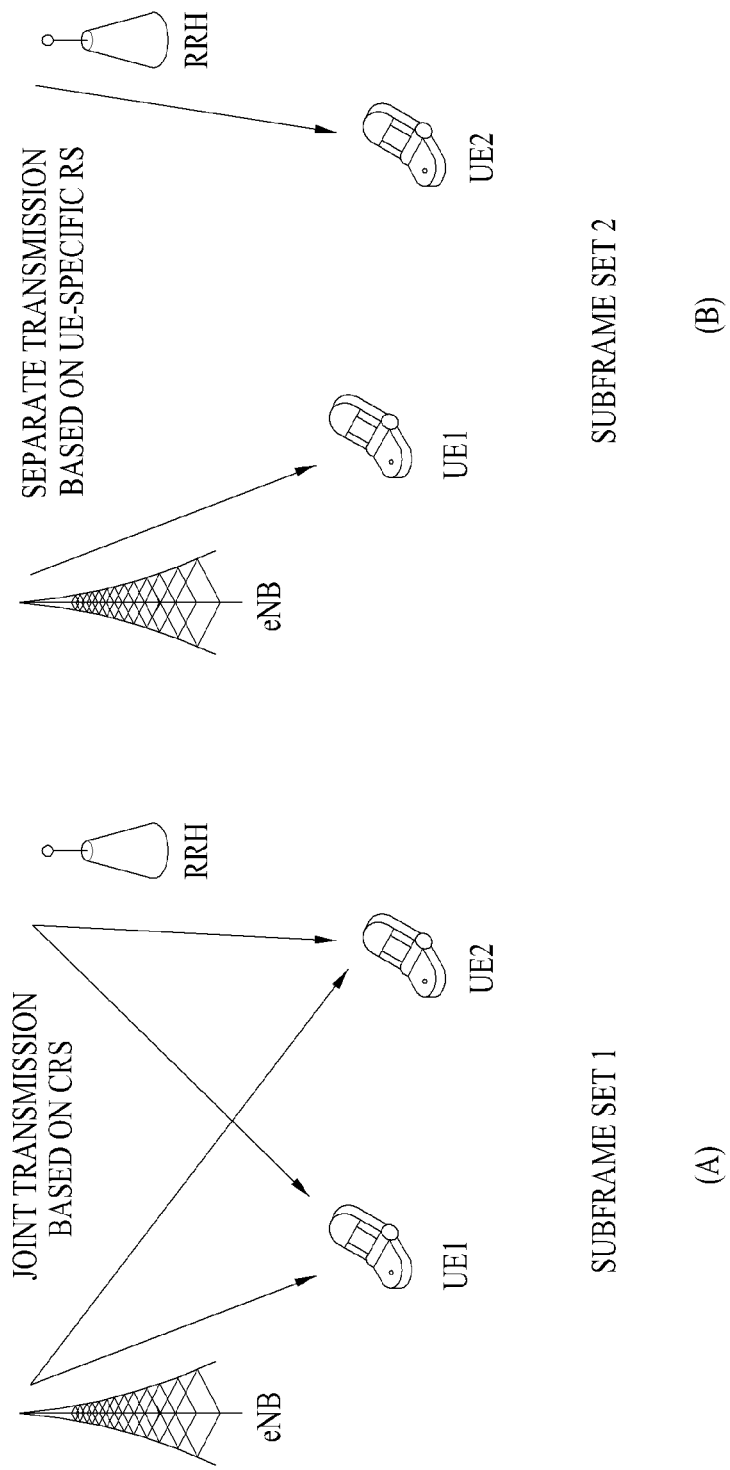
FIG. 8 illustrates exemplary resource-specific transmission modes according to an embodiment of the present invention.

FIG. 8 illustrates exemplary resource-specific transmission modes according to an embodiment of the present invention.

Referring to FIG. 8, if an eNB has a Remote Radio Head (RRH) at a geographically distant location, a transmission mode may be set independently according to the characteristics of each resource set based on a cooperative transmission scheme and/or an RS configuration between the eNB and the RRH.

For example, in the case where the eNB and the RRH transmit CRSs using the same cell ID as illustrated in FIG. 8(*a*), if a first subframe set includes subframes each having a CRS even in a data region, it is preferred that the eNB and the RRH transmit PDSCHs simultaneously in the first subframe set based on the CRSs transmitted by the eNB and the RRH (this may be regarded as joint transmission from the two transmission points). Specifically, both the eNB and the RRH preferably perform CRS-based PDSCH transmission in the first subframe set, as in transmission mode 4.

On the other hand, if a second subframe set includes MBSFN subframes each having no CRS in a data region as illustrated in FIG. 8(*b*), a PDSCH should be transmitted in the second subframe set based on a UE-specific RS. In this case, it is preferred that the eNB and the RRH transmit PDSCHs to different UEs near to them by processing such as appropriate beamforming because a cell splitting gain can be achieved so that time/frequency resources are spatially reused. Specifically, downlink transmission is preferable in transmission mode 9 supporting UE-specific RS transmission in FIG. 8(*b*).

To apply a resource set-specific transmission mode, the following operations are required.

1) CSI Measurement and CQI Calculation

When a UE measures CSI for each resource set and feeds back the CSI, the UE should assume a transmission mode configured for the resource set in calculating the CSI. Herein, the overhead of a UE-specific RS or a precoding scheme used in an eNB may be involved. The UE is configured to measure CSI, assuming a transmission mode configured for a resource set including a CSI reference resource at each CSI reporting time point.

In aperiodic CSI reporting, for example, if a PDCCH triggering CSI reporting is transmitted in a specific subframe, the UE measures CSI, assuming a transmission mode configured for a subframe set including the specific subframe.

2) Transmission Mode for Resources Other than Configured Resource Sets

The eNB may not over all uplink or downlink resources with configured resource sets. Even in this case, a transmission mode should be determined for corresponding resources and the eNB may indicate a transmission mode for resources belonging to no resource sets by higher-layer signaling such as RRC signaling. Or the transmission mode for the resources may be assumed to be identical to the transmission mode of a specific resource set, for example, a resource set with a first index.

In another example, a specific transmission mode is set as a default transmission mode and a transmission mode available to a specific resource set may also be signaled along with corresponding resource set information (e.g. subframe pattern information). In this case, the eNB covers all uplink or downlink resources with configured resource sets.

3) Determination of Uplink Transmission Mode

An uplink transmission mode may be determined according to a resource set to which a downlink subframe belongs. If a UL grant being uplink scheduling information is received in subframe #n and a PUSCH is transmitted in subframe #n+k based on the UL grant, a transmission mode for transmitting the PUSCH may be determined according to the subframe set (i.e. resource set) of the downlink subframe carrying the UL grant for the corresponding subframe.

For example, if subframe #n belongs to a first resource set, an uplink transmission mode configured for the first resource set may be used in subframe #n+k. If the first resource set includes subframes that a neighbor cell configures as ABSs, a transmission mode using UL MIMO may be used with no regard to interference because the neighbor cell does not perform uplink signal transmission in subframe #n+k.

In contrast, if subframe #n belongs to a second resource set, an uplink transmission mode configured for the second resource set is available to subframe #n+k. If the second resource set includes normal subframes that an aggressor cell does not configure as ABSs, interference at or above a certain level is expected. Thus, a transmission mode that does not use MIMO transmission may be preferable for subframe #n+k.

It may be contemplated as a modification of the above-described present invention that an eNB and a UE configure a transmission mode for each subframe according to whether the subframe is configured as an MBSFN subframe. The eNB may configure two transmission modes for the UE and may command the UE to use a first transmission mode (e.g. a CRS-based transmission mode) for a non-MBSFN subframe, for example, a normal subframe and a second transmission mode (e.g. a UE-specific RS-based transmission mode) for an MBSFN subframe.

As described above, if an optimum transmission mode is different for each subframe set, that is, each resource set, it is also necessary to set different parameters related to a transmission mode configuration and a CSI reporting configuration, for example, a codebook subset restriction field for each resource set.

To feed back the spatial characteristics of channels (or the multi-antenna characteristics of channels) for the purpose of providing information about precoding for use in downlink data transmission of the eNB, the UE uses a predefined codebook. The use of a codebook means that the eNB and the UE predefine a codebook having a finite number of codewords and the UE feeds back the index of a codeword representing channels between the eNB and the UE effectively. For reference, one codeword may represent one channel characteristic.

Codebook subset restriction refers to an operation of transmitting a codebook subset including codewords from an eNB to a UE and commanding the UE to perform a channel reporting operation using only codewords included in the codebook subset. With the codebook subset restriction, the eNB may use only a codeword of a specific direction in precoding and may notify the UE of this operation so that the UE may report CSI appropriately.

Indication of different codebook subsets for different resource sets by the eNB may be helpful in the codebook subset restriction. For example, if an eNB performs inter-cell interference coordination with a second eNB in the first subframe set and with a third eNB in the second subframe set, different codebook subsets may be used in the two subframe sets because the eNB may cause interference to the second and third eNBs with different precoding matrices. Therefore, to allow the UE to more effectively report channels, the eNB preferably transmits a plurality of codebook subset restriction fields and the UE preferably uses different codebook subsets for different resource sets (or different subframe sets).

In an implementation example, the eNB may transmit a codebook subset restriction field for each resource set (or each subframe set) and the number of resource sets and the number of codebook subset restrictions fields may be plural.

Under circumstances, the eNB may not cover all downlink resources with any configured resource set. In this case, specific resources may not belong to any resource set. Nonetheless, codebook subset restriction should be determined for the resources and the eNB may indicate a codebook subset for such resources belonging to no resource set by higher-layer signaling such as RRC signaling. Or it may be assumed that the codebook subset of the resources is identical to that of a specific resource set (e.g. a resource set with a first index).

In another method, a specific codebook subset may be set as a default codebook subset and a codebook set for a specific resource set may be signaled along with corresponding resource set information.

In resource-specific codebook subset restriction, the UE should use a codebook subset configured for a target resource set at a corresponding feedback time point, when feeding back precoding information about a downlink. For example, the UE may use a codebook configured for a resource set including a CSI reference resource at each feedback time point and feed back only a codeword allowed in the codebook subset.

Parameters related to the afore-described transmission mode configuration and CSI reporting configuration include an SRS-related parameter required to acquire uplink channel information (or to acquire downlink channel information based on the symmetry between a downlink and an uplink).

The eNB may indicate a plurality of SRS parameter sets (e.g. an SRS transmission period, a subframe offset, a frequency hopping pattern, an SRS comb index, an SRS transmission bandwidth, precoding information, etc.) to the UE so that the UE may use a different parameter set for each resource set carrying an SRS. Particularly, in aperiodic SRS transmission triggered by a PDCCH, a resource-specific SRS transmission may be performed by using an SRS parameter set mapped to a resource set carrying the PDCCH triggering the SRS transmission.

The present invention is also applicable to a dynamic resource allocation scheme. Specifically, if uplink resources configured by system information (e.g. an uplink band in FDD or an uplink subframe in TDD) are changed to downlink resources dynamically or if downlink resources configured by system information are changed to uplink resources dynamically, the present invention is applicable. The dynamic resource changing method is useful in that an instantaneous increase in downlink data or uplink data can be handled.

Uplink resources are dynamically changed to downlink resources in two cases where 1) the downlink resources are originally configured as downlink resources and 2) the downlink resources are originally configured as uplink resources but borrowed as downlink resources. In these cases, different transmission modes are preferable because the interference characteristics of the resources may be different.

Figure 9:
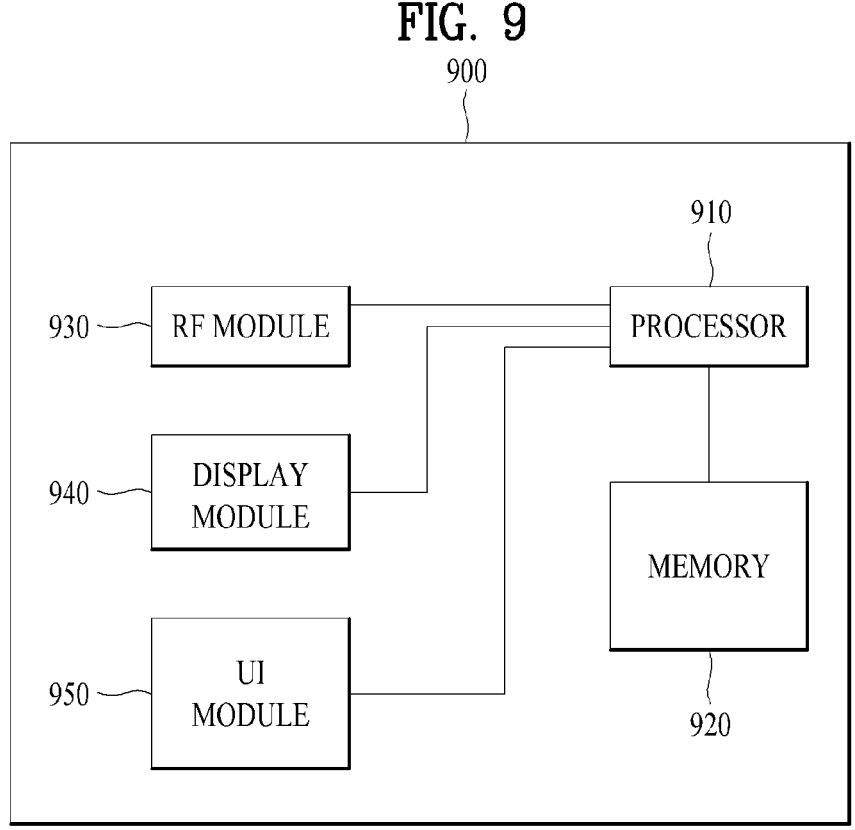
FIG. 9 is a block diagram of a communication apparatus according to an embodiment of the present invention.

FIG. 9 is a block diagram of a communication apparatus according to an embodiment of the present invention.

Referring to FIG. 9, a communication apparatus 900 includes a processor 910, a memory 920, a Radio Frequency (RF) module 930, a display module 940, and a User Interface (UI) module 950.

The communication device 900 is shown as having the configuration illustrated in FIG. 9, for clarity of description. Some modules may be added to or omitted from the communication apparatus 900. In addition, a module of the communication apparatus 930 may be divided into more modules. The processor 910 is configured to perform operations according to the embodiments of the present invention described before with reference to the drawings. Specifically, for detailed operations of the processor 910, the descriptions of FIGS. 1 to 8 may be referred to.

The memory 920 is connected to the processor 910 and stores an Operating System (OS), applications, program codes, data, etc. The RF module 930, which is connected to the processor 910, upconverts a baseband signal to an RF signal or downconverts an RF signal to a baseband signal. For this purpose, the RF module 930 performs digital-to-analog conversion, amplification, filtering, and frequency upconversion or performs these processes reversely. The display module 940 is connected to the processor 910 and displays various types of information. The display module 940 may be configured as, not limited to, a known, component such as a Liquid Crystal Display (LCD), a Light Emitting Diode (LED) display, and an Organic Light Emitting Diode (OLED) display. The UI module 950 is connected to the processor 910 and may be configured with a combination of known user interfaces such as a keypad, a touch screen, etc.

The embodiments of the present invention described above are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present invention or included as a new claim by a subsequent amendment after the application is filed.

In the embodiments of the present invention, a specific operation described as being performed by the BS may be performed by an upper node of the BS. Namely, it is apparent that, in a network comprised of a plurality of network nodes including a BS, various operations performed for communication with a UE may be performed by the BS, or network nodes other than the BS. The term 'BS' may be replaced with a fixed station, a Node B, an eNode B (eNB), an access point, etc.

The embodiments of the present invention may be achieved by various means, for example, hardware, firmware, software, or a combination thereof. In a hardware configuration, the methods according to exemplary embodiments of the present invention may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, an embodiment of the present invention may be implemented in the form of a module, a procedure, a function, etc. Software code may be stored in a memory unit and executed by a processor. The memory unit is located at the interior or exterior of the processor and may transmit and receive data to and from the processor via various known means.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

INDUSTRIAL APPLICABILITY

While the foregoing methods and apparatuses for determining a resource-specific transmission mode in a wireless communication system have been described in the context of a 3GPP LTE system, by way of example, they are also applicable to various other wireless communication systems.

The invention claimed is:

1. A method for transmitting and receiving a signal to and from a base station at a user equipment in a wireless communication system, the method comprising:
   receiving information indicating a first subframe set and a second subframe set from the base station;
   receiving an uplink grant on a specific subframe from the base station; and
   transmitting an uplink signal based on the uplink grant to the base station,
   wherein each of the first subframe set and the second subframe set comprises a plurality of subframes,
   wherein, when the specific subframe does not belong to any one of the first and second subframe sets, a transmission mode of the uplink signal is configured by a radio resource control (RRC) layer signaling,
   wherein, when the specific subframe belongs to the first subframe set, the uplink signal is transmitted using a multi-antennas transmission mode with ignoring the configured transmission mode, and
   wherein, when the specific subframe belongs to the second subframe set, the uplink signal is transmitted using a single antenna transmission mode with ignoring the configured transmission mode.

2. The method according to claim 1, wherein each of the first subframe set and the second subframe set has a different level of interference that can be caused by a neighbor base station.

3. A user equipment in a wireless communication system, the user equipment comprising:
   a transceiver configured to transmit and receive a signal to and from a base station; and
   a processor configured to:
   process the signal,
   control the transceiver to receive information indicating a first subframe set and a second subframe set from the base station,
   control the transceiver to receive an uplink grant on a specific subframe from the base station, and
   control the transceiver to transmit an uplink signal based on the uplink grant to the base station,
   wherein each of the first subframe set and the second subframe set comprises a plurality of subframes,
   wherein, when the specific subframe does not belong to any one of the first and second subframe sets, a transmission mode of the uplink signal is configured by a radio resource control (RRC) layer signaling,
   wherein, when the specific subframe belongs to the first subframe set, the processor controls the wireless communication module to transmit the uplink signal using a multi-antennas transmission mode with ignoring the configured transmission mode, and
   wherein, when the specific subframe belongs to the second subframe set, the processor controls the wireless communication module to transmit the uplink signal using a single antenna transmission mode with ignoring the configured transmission mode.

4. The user equipment according to claim 3, wherein each of the first subframe set and the second subframe set has a different level of interference that can be caused by a neighbor base station.

* * * * *